United States Patent
Nakanishi

[11] Patent Number: 5,872,637
[45] Date of Patent: Feb. 16, 1999

[54] IMAGE COMMUNICATION SYSTEM

[75] Inventor: Hiroyuki Nakanishi, Yokohama, Japan

[73] Assignee: Canon Kabushiki Kaisha, Tokyo, Japan

[21] Appl. No.: 401,281

[22] Filed: Mar. 9, 1995

Related U.S. Application Data

[63] Continuation of Ser. No. 960,288, Oct. 13, 1992, abandoned, which is a continuation of Ser. No. 486,838, Mar. 1, 1990, abandoned.

[30] Foreign Application Priority Data

Mar. 1, 1989 [JP] Japan ................................. 1-046417

[51] Int. Cl.$^6$ .................................................. H04N 1/00
[52] U.S. Cl. .............. 358/403; 395/200.47; 395/200.49; 358/434; 382/305
[58] Field of Search ................................. 358/400, 401, 358/402, 407, 408, 434, 435, 436, 437, 438, 439, 442–444, 468, 403–406; 382/41, 305, 306; 379/96, 53, 100, 93; 364/940, 948, 900, 200, 283.3, 518, 514; 395/200, 325, 425, 600, 650, 200.47, 200.49; 348/61; H04M 7/14

[56] References Cited

U.S. PATENT DOCUMENTS

| | | | |
|---|---|---|---|
| 4,121,196 | 10/1978 | Johnson et al. | 382/41 |
| 4,486,828 | 12/1984 | Kitammura et al. | 395/200 |
| 4,503,499 | 3/1985 | Mason et al. | 304/200 |
| 4,573,083 | 2/1986 | Shimizu | 358/434 |
| 4,633,506 | 12/1986 | Kato | 358/22 |
| 4,677,649 | 6/1987 | Kunishi et al. | |
| 4,717,967 | 1/1988 | Yoshida | |
| 4,727,589 | 2/1988 | Hirose et al. | 395/200 |
| 4,772,955 | 9/1988 | Kurahayashi et al. | |
| 4,789,900 | 12/1988 | Takahashi | |
| 4,805,119 | 2/1989 | Maeda et al. | 379/96 |
| 4,814,890 | 3/1989 | Kato | |
| 4,823,193 | 4/1989 | Takahashi | |
| 4,827,349 | 5/1989 | Ogata et al. | |
| 4,887,164 | 12/1989 | Takahashi | 379/100 |
| 4,907,094 | 3/1990 | Mishima et al. | |
| 4,939,767 | 7/1990 | Saito et al. | 358/85 |
| 4,949,187 | 8/1990 | Cohen | 358/85 |
| 4,965,676 | 10/1990 | Ejiri et al. | 358/404 |
| 5,019,975 | 5/1991 | Mukai | 364/413.13 |

OTHER PUBLICATIONS

APS Text Search & Retrieval Class Room Manual for M.S. Patent Office Planning Research Corporation Nov. 1987.

*Primary Examiner*—Michael H. Lee
*Attorney, Agent, or Firm*—Fitzpatrick, Cella, Harper & Scinto

[57] ABSTRACT

There is disclosed an image communication system, and an apparatus, in which data stored in a memory are accessible in convenient manner from a remote location. The method enables erasure or revision of data in a remote station or causes the remote station to transmit such stored data, by sending a secret identification signal to such remote station.

13 Claims, 6 Drawing Sheets

FIG. 5B
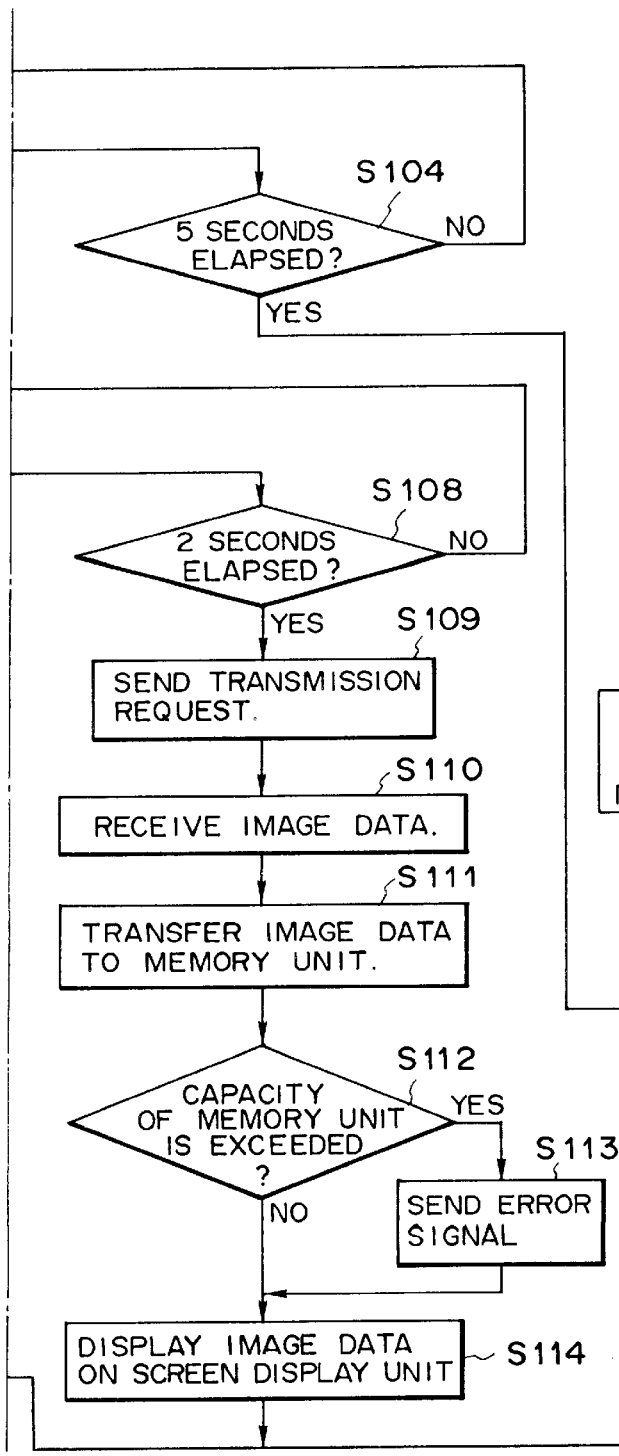
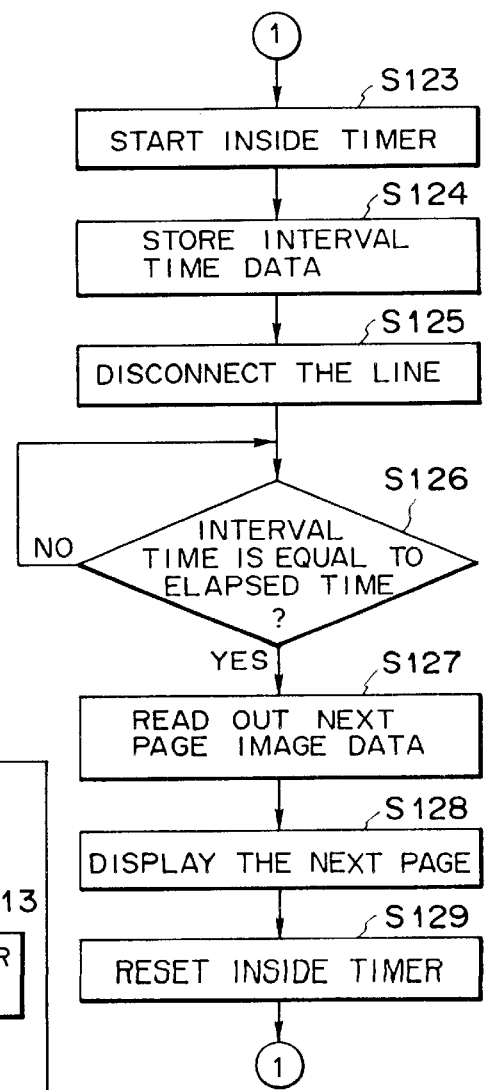

IMAGE COMMUNICATION SYSTEM

This application is a continuation-in-part division, of application Ser. No. 07/960,288 filed Oct. 13, 1992, now abandoned, which in turn is a continuation of application Ser. No. 07/486,838 filed Mar. 1, 1990, now abandoned.

BACKGROUND OF THE INVENTION

1. Field of the Invention

The present invention relates to an image communication system, and more particularly such image communication system for making communication between a calling apparatus and a called apparatus, through a predetermined line and utilizing means for storing image data to be transmitted or predetermined data relating to the communication.

2. Related Background Art

There is already known, as disclosed in the U.S. Pat. Nos. 4,717,967, 4,814,890, 4,823,193, 4,789,900, 4,677,649, 4,772,955, 4,787,349 and 4,827,349 and the U.S. patent application. Ser. No. 147,224, a facsimile apparatus capable of storing image information transmitted or received, or abbreviated telephone numbers, in a memory.

In an apparatus provided with an image memory of large capacity for storing the transmitted or received image data, such buffering of image data in the memory reduces the time required for communication or the cost of communication. Also it enables data reception into the memory, even in case of function defects in the recording apparatus, for example lack of recording paper.

Also there are conducted storage of image data into the memory automatically at the transmitting or receiving operation, and registration of telephone numbers etc. according to the operation of the operator.

However, in the conventional apparatus are described above, the registration or deletion of data into or from the memory can only be conducted from the operation panel of the apparatus, so that the operator has to go to the apparatus for such operation on the memory.

In such structure, if the recording sheet is used up while the operator is absent from the office, the apparatus executes substituted reception whereby the received image data are stored in the memory. However, the memory may become full and the apparatus may become incapable of communication if the apparatus is not attended over a prolonged period.

It has therefore proposed, by remote control, to erase the image data in the memory of the apparatus or to transmit said image data by polling, but such prior technology has a drawback of eventually causing erasure of important image data, or polling of unnecessary image data, for example of a direct mail, because the image data are simply erased or transmitted.

SUMMARY OF THE INVENTION

An object of the present invention is to provide an image communication system not associated with the above-mentioned drawbacks, and an image communication apparatus adapted for use therein.

Another object of the present invention is to provide an image communication system allowing convenient access to the data stored in a memory from a remote location, and an image communication apparatus adapted for use therein.

Still another object of the present invention is to provide an image communication system allowing erasure or transmission of the data stored in a memory by an operation from a remote location, and an image communication apparatus adapted for use in such system.

Still another object of the present invention is to provide an image display apparatus for displaying an image stored in a memory, allowing erasure of a desired image in the memory and to display of new image by an operation from a remote location.

Still other objects of the present invention will become fully apparent from the following description to be taken in conjunction with the attached drawings, and also from the appended claims.

DETAILED DESCRIPTION OF THE PREFERRED EMBODIMENTS

Now the present invention will be clarified in detail by embodiments thereof shown in the attached drawings.

Figure 1:
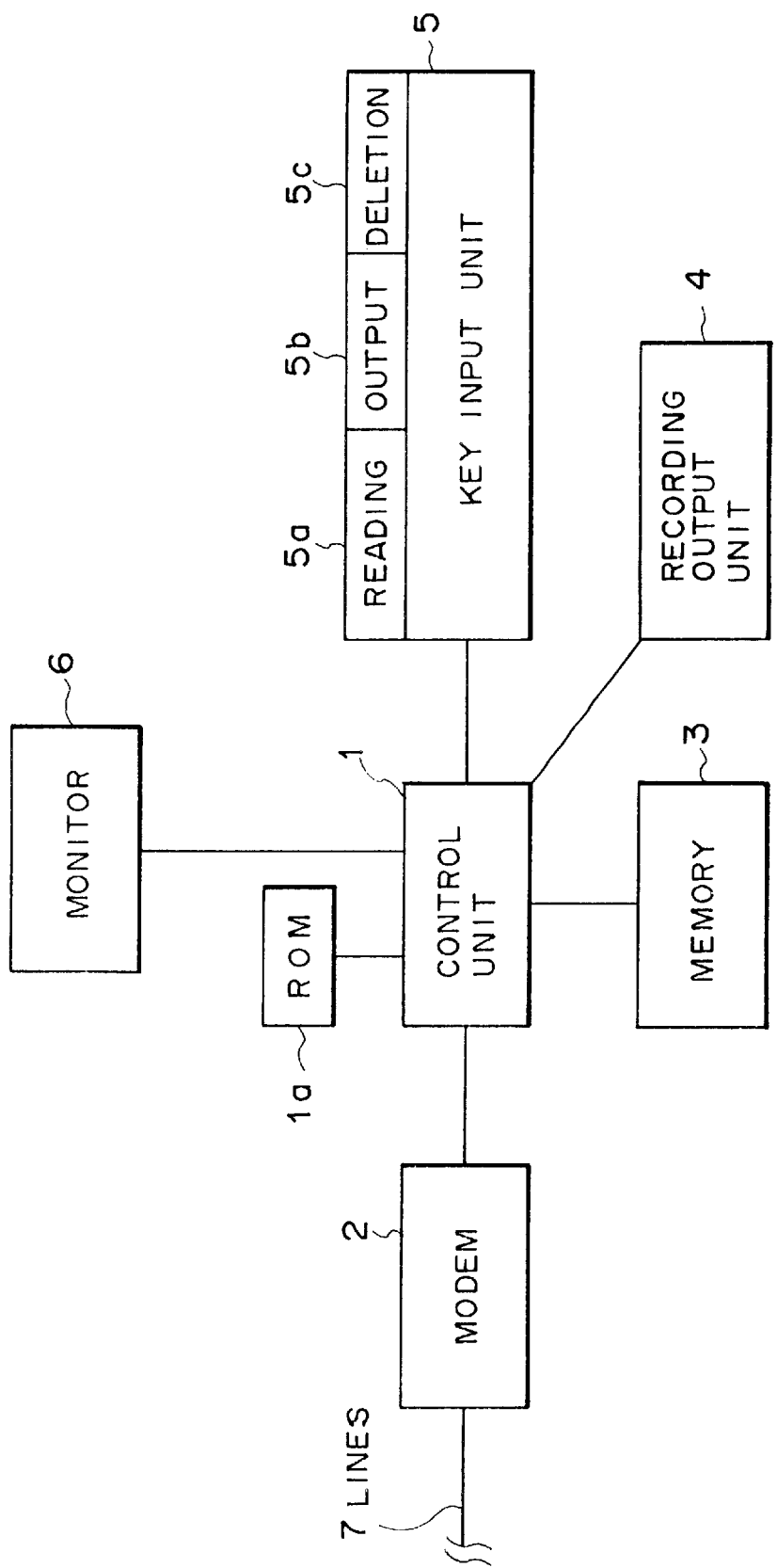
FIG. 1 is a block diagram of a facsimile apparatus embodying the present invention.

FIG. 1 is a block diagram of a facsimile apparatus embodying the present invention, having a structure in which a control unit 1, composed for example of a microprocessor, controls other units 2 to 5. The control program of the control unit 1 is stored in a ROM 1a.

In the following there will be explained those units controlled by the control unit 1. In the following explanation, other parts of the facsimile apparatus, such as the image reading unit, are omitted from the illustration.

A modem 2, used for connecting the facsimile apparatus with a communication channel such as a telephone line, executes modulation and demodulation of the image signal and the control signal. There can be employed various modulation/demodulation methods, such as MH, MR, MMR etc. according to the kind of communication channel and the procedure employed in the facsimile apparatus. The modem 2 is further capable of sending a DTMF signal to the line 7 in response to an input signal to the control unit 1.

A memory 3, composed for example of a RAM, a magnetic disk or a magnetic tape, serves to store the telephone numbers in abbreviated form, and the transmitted or received image data.

A record output unit 4, for generating an image or characters in the form of dot matrix, is composed for example of a thermal printer, a laser beam or a bubble jet (ink jet) printer.

A key input unit 5 for controlling the functions of the apparatus, is composed of usual numeral keys and function keys. In the present embodiment there are further provided a read-out key 5a for executing the read-out and transmission of the image data from the memory 3' of another station (mark "'" indicating another station); an output key 5b for recording the image data, received from another station, on a recording sheet; and a deletion key 5c for deleting the image data in the memory 3' of another station.

A monitor 6, composed for example of a cathode ray tube or a liquid crystal display (LCD), has a display area capable of displaying at least the initial portion of the image data stored in the memory 3 of this station or the memory 3' of another station, through e.g., dot matrix.

In the following there will be explained the function of the above-explained structure.

Figure 2:
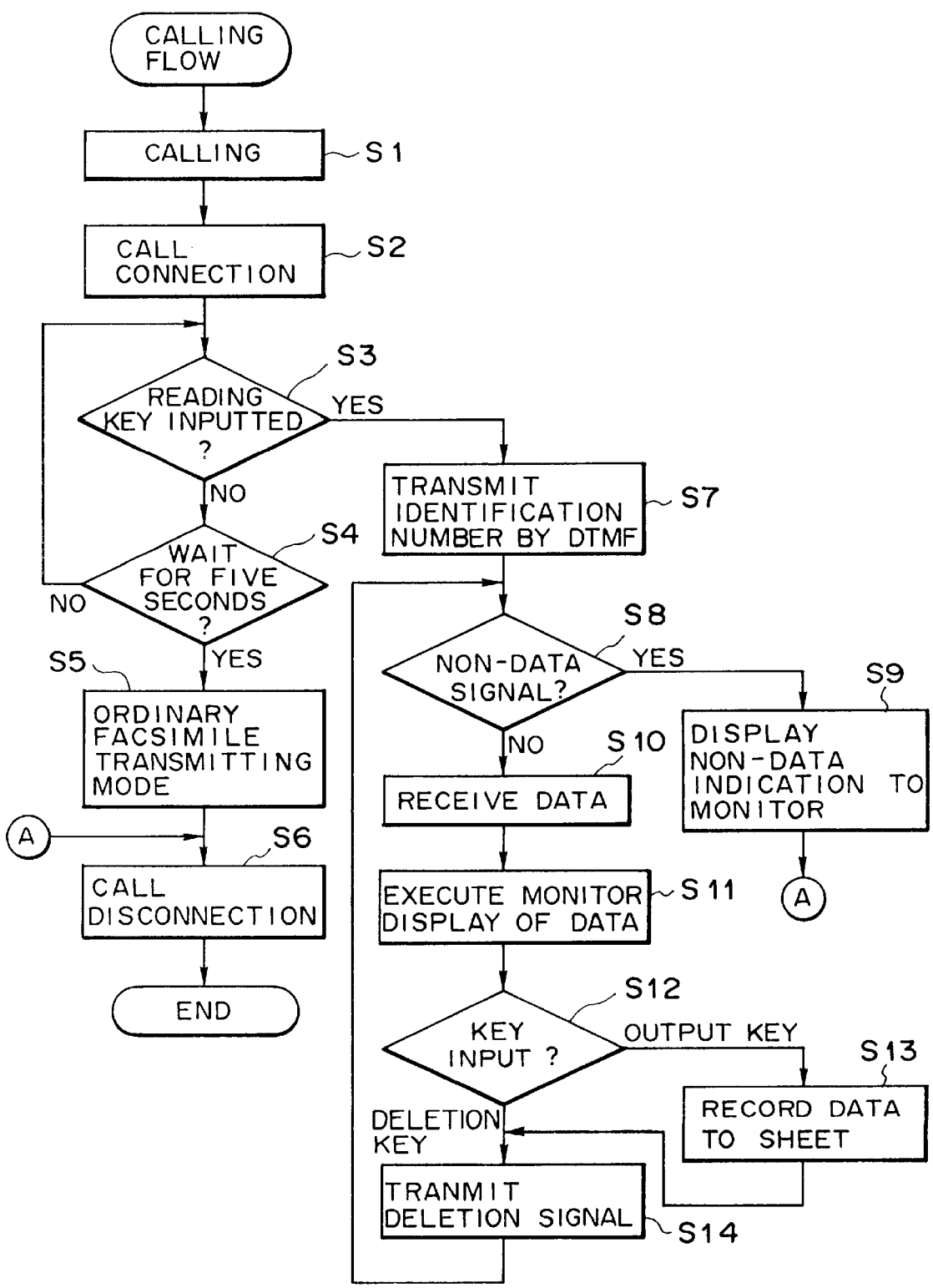
FIGS. 2 and 3 are flow charts showing the sequence of communication in the apparatus shown in FIG. 1.
Figure 3:
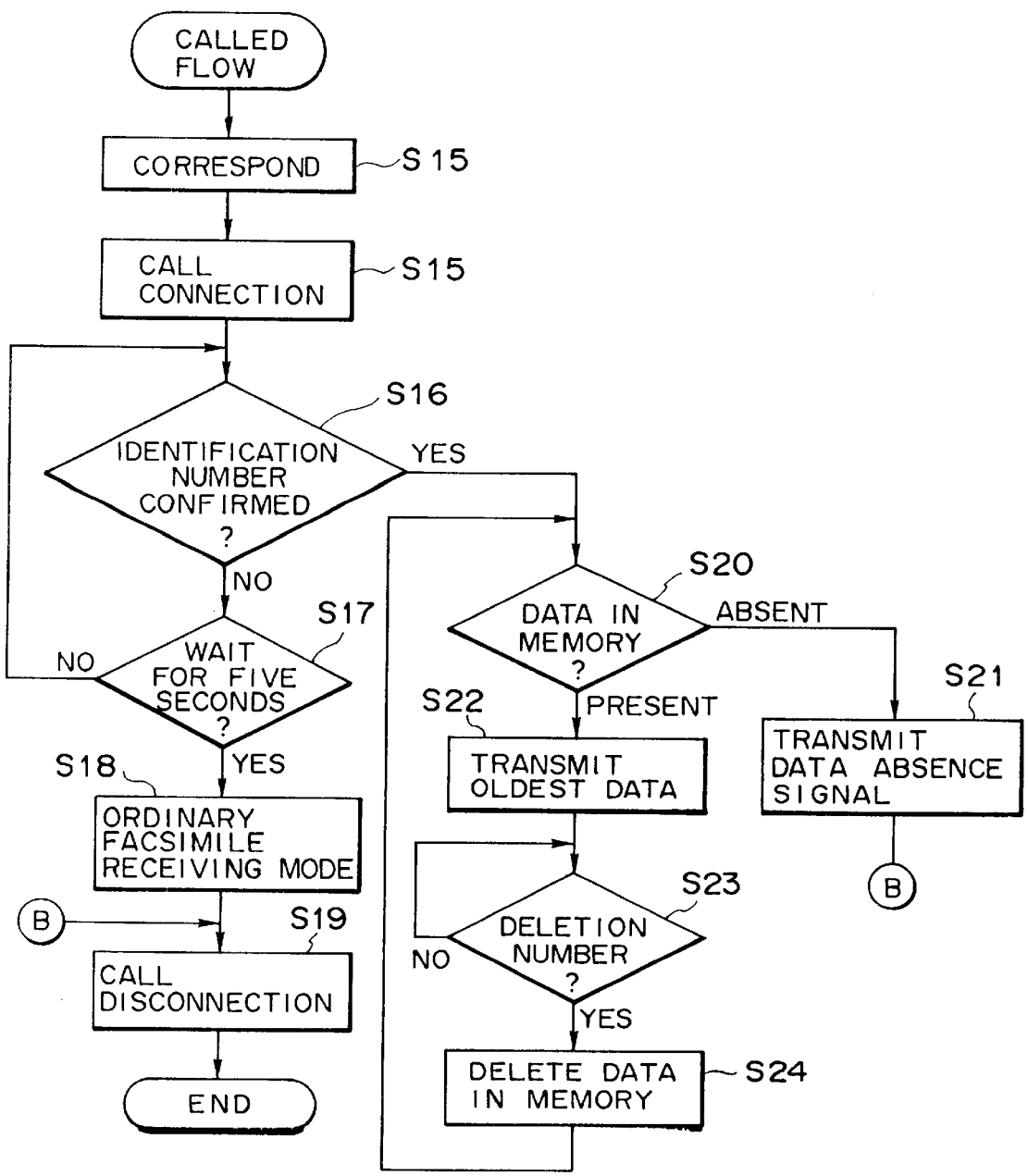

FIGS. 2 and 3 show the sequence of communication conducted between the facsimile apparatus shown in FIG. 1. In the following is explained a procedure of calling from an apparatus to the other, causing the called apparatus to transmit the image data stored in the memory of said called apparatus, displaying said data on the monitor of the calling apparatus, and eventually recording said data in the record output unit 4. The operations of the called apparatus are conducted without the operator. The programs corresponding to the sequence shown in FIG. 2 (calling apparatus) and that shown in FIG. 3 (called apparatus) are stored in the ROM 1a shown in FIG. 1.

At first, the calling apparatus calls the other apparatus, in a step S1 shown in FIG. 2. The telephone number of said the other apparatus, and other data required for calling are entered from the key input units 5.

Then a step S2 makes call connection with the called apparatus.

The called apparatus executes, in steps S15, S15' in FIG. 3, a response to the call signal generated in said step S1, and a call connection.

Then the calling apparatus awaits, in steps S3 and S4, the input of the read-out key 5a of the key input unit 5, for 5 seconds. The sequence repeats a loop of the steps S3 and S4 until the read-out key 5a is depressed, and the sequence proceeds to a step S7 when said key 5a is depressed. On the other hand, if the waiting time of 5 seconds expires, the sequence proceeds to a step S5.

In the step S5, the calling apparatus executes ordinary facsimile transmission (or polling reception). After such transmission or reception, a step S6 effects call disconnection, and the procedure is terminated.

On the other hand, in the step S7, the calling apparatus transmits a secret identification (ID) number by a DTMF signal. Said secret ID number is entered by the operator of the calling apparatus, from the key input unit 5. It is assumed that, in the called apparatus, a predetermined secret ID number is registered in advance in the memory 3.

In the called apparatus, steps S16 and S17, shown in FIG. 3, effect the detection for 5 seconds of the secret ID number transmitted from the calling apparatus. Unless a correct ID number is detected within 5 seconds, a step S18 executes ordinary facsimile reception, and a step S19 executes call disconnection.

On the other hand, if a secret ID number is received and matches the number stored in advance in the memory 3', the sequence proceeds to a step S20.

In the called apparatus, the step S20 discriminates whether the memory 3' contains data which have not been processed by a loop of steps S22 to S24 to be explained later. Said data can for example be abbreviated telephone numbers, but are assumed to be image data for the purpose of simplicity in explanation.

In case the step S20 identifies the presence of data in the memory 3', a step S22 transmits, to the calling apparatus, the image data of the earliest input (or reception) time. It is assumed that the data file of the memory 3' stores data on such input time. If the data are absent in the memory 3', a step S21 sends a signal, indicating the absence of data, to the calling apparatus.

In the calling apparatus, a step S8 discriminate whether a non-data signal has been received from the called apparatus. If said non-data signal has been received, a step S9 effects a display, on the monitor 6, indicating the absence of image data in the memory 3' of the called apparatus, and then the step S6 executes call disconnection.

On the other hand, if the step S8 does not receive said non-data signal, the sequence proceeds to a step S10 for receiving the image data transmitted by the called apparatus in the step S22 in FIG. 3. The calling apparatus stores the received image data in the memory 3, regardless of the presence or absence of the recording sheet.

Then, in the calling apparatus, a step S11 displays said received image data on the monitor 6.

The operator of the calling apparatus judges, by observing said display, whether a recorded output of said data is necessary, and depresses the output key 5b of the key input unit 5 if such output is required. Also if such output is unnecessary and if it is desired to delete said data from the memory 3' of the called apparatus, the deletion key 5c of the key input unit 5 is depressed. The sequence proceeds a step S13 or S14 respectively when the output key 5b or the deletion key 5c is depressed.

The step S13 transfers the received image data, stored in the memory 3, to the record output unit 4 for effecting the image recording.

The step S14 sends, to the called apparatus, a deletion signal instructing the deletion of the image data transmitted in the step S22, from the memory 3', and the sequence returns to the step S8. Said deletion signal is sent for example in the form of a DTMF signal.

The called apparatus detects, in a step S23, the reception of said deletion signal. Upon reception of said deletion signal, a step S23 deletes the image data, transmitted in the step S22, from the memory 3', and the sequence returns to the step S20 for discriminating whether unprocessed image data still remain in the memory 3'.

The steps S20 to S24 of the called apparatus are continued until the step S20 identifies the absence of unprocessed data.

The above-explained process enables a polling transmission of image data stored in the memory of a desired facsimile apparatus to a remote location by an instruction from such remote location, and thus transmitted data are received in a memory and can be confirmed on the display.

If said data are identified unnecessary in the confirmation on the display, said data can be deleted by remote control with a deletion signal.

Thus, with the present embodiments, even when the operator is away from the location of the facsimile apparatus over a prolonged period, he can cause the apparatus to transmit the data in the memory to a remote location by a control from such remote location.

Also since the data in the memory of the desired facsimile apparatus can be arbitrarily deleted, it is rendered possible to prevent situation of disabled communication resulting from fully occupied memory capacity in the course of substituted reception, for example in case of absence of recording paper.

Also in the foregoing embodiment, since a display indicating the absence of data is given if data are not present in the memory of the desired facsimile apparatus, it is possible to confirm that said memory is usable, without cumbersome retrieving procedure.

Furthermore, since the data in said memory are retrieved in succession from the earliest one in time, the chronological history of communications can be easily known from a remote location.

Also the secrecy of communication is securely maintained as the access to data from the remote location is permitted through the transmission and matching of a secret identification number.

In the foregoing description there is shown an example of access to image data from a remote location, but access to other data, such as the telephone number of another station, or administrative or statistical data on communication, is naturally possible in a similar process as long as such data are stored in the memory 3'.

Also in the foregoing embodiment, the secret ID signal, deletion signal etc. are sent in the form of a DTMF signal, but there may naturally be employed other signal formats, such as facsimile procedure signals defined in the CCITT recommendations.

Also in the foregoing embodiments, the calling and called apparatus are both facsimile apparatus, but the present invention is applicable also to an image display apparatus with facsimile communication function, as disclosed in the U.S. patent application Ser. No. 438,009.

Figure 4:
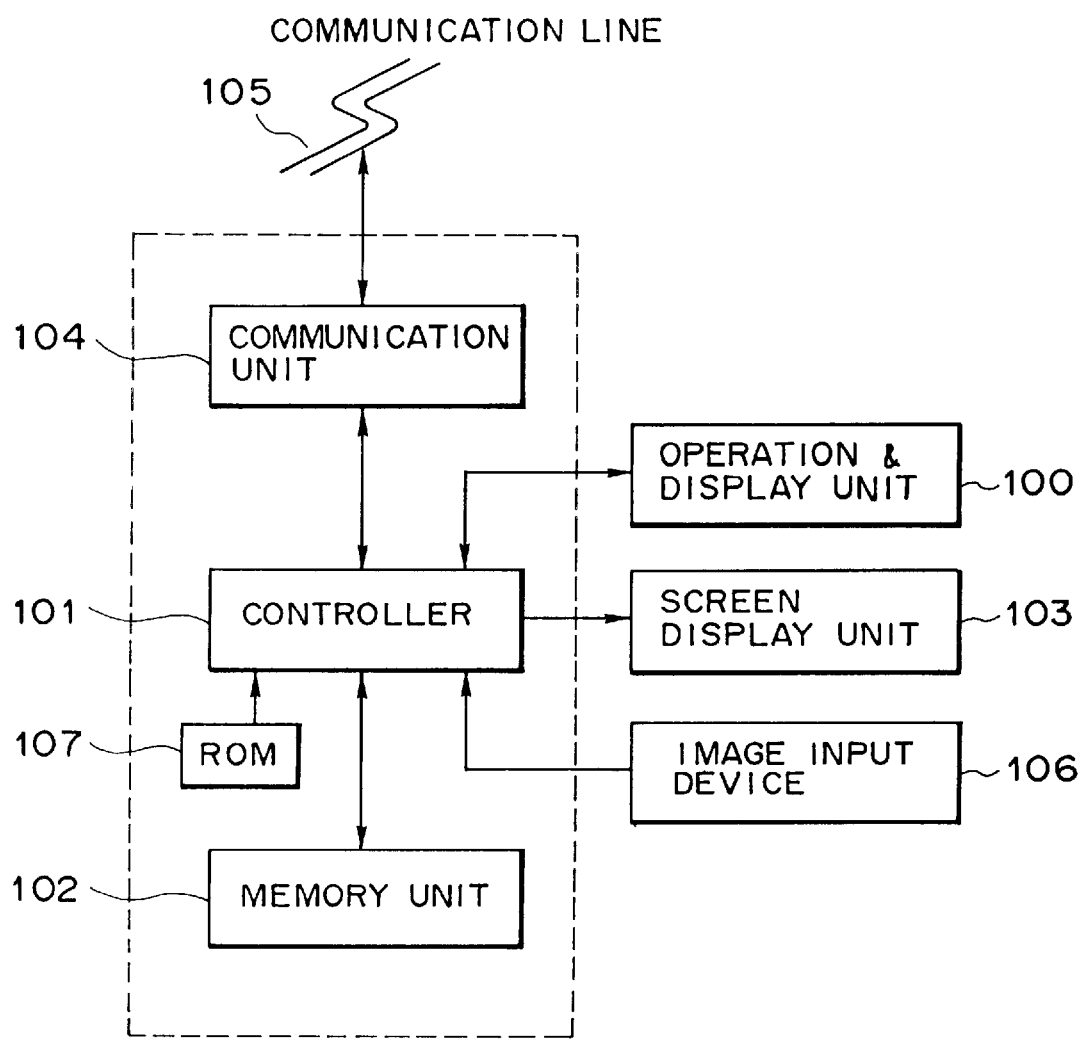
FIG. 4 is a block diagram of an image display apparatus embodying the present invention.

Said image display apparatus is shown in a block diagram in FIG. 4.

Figure 5A:
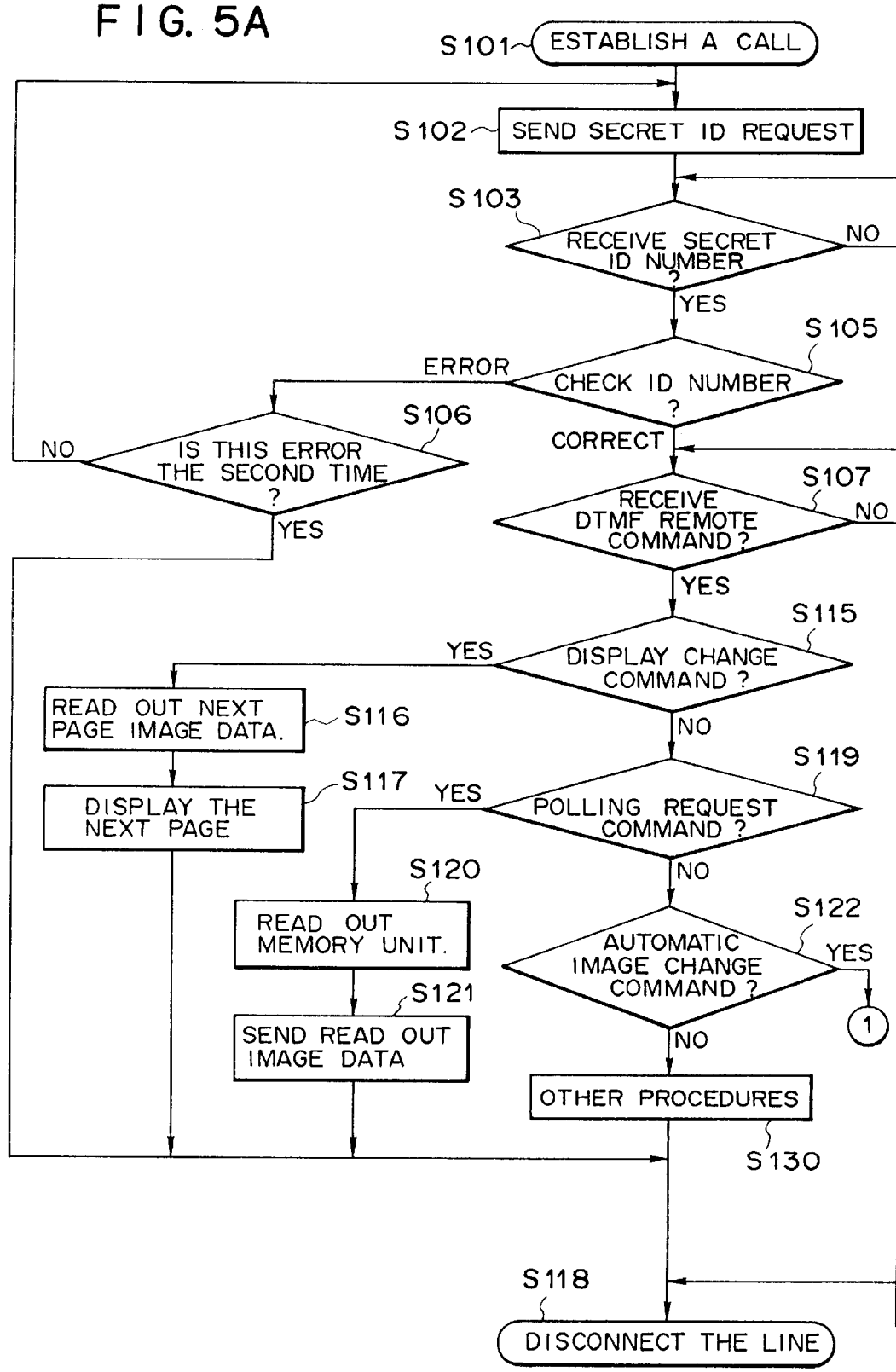
FIG. 5 is a flow chart of the function of the image display apparatus shown in FIG. 4.

FIG. 4 is a block diagram showing a structure of image display apparatus having a communication function. The display apparatus includes an operation and display unit 100, a memory unit 102 for storing image data to be displayed and information for display control. The memory unit 102 can store image data corresponding to a plurality of pages. This memory unit corresponds to memories 3 and 3'. A screen display unit 103 is also provided for displaying images. The apparatus also includes a communication unit 104 for receiving image data from a communication line 105 and for transmitting image data stored in the memory unit 102 to outside apparatus via the line 105, and the communication unit 104 is structured as a conventional facsimile apparatus. The memory unit 102 stores image data received from the line 105 in a compressed and coded condition. The line 105 can be a general public line, an excluding line, or the like. The apparatus also has a controller 101 for controlling the entire apparatus, an image input device 106, e.g. an image reader, for inputting image data and a ROM (Read Only Memory) 107 for storing a control program of the controller 101 as shown in FIG. 5.

Referring to the flowchart of FIG. 5, an operation of the display apparatus will be explained as follows.

First of all, when a calling facsimile apparatus calls this apparatus via the line 105 to establish a call (S101), this apparatus sends a secret identification request signal (S102).

Unless a secret identification number is received within five seconds, the controller 101 disconnects the line and ends the communication in steps S102, S103 and S118.

On the other hand, if the secret identification number is received within five seconds of the request signal (S103, S104), the controller 101 discriminates whether the identification number is correct or not (S105). If it is not correct, the controller 101 sends the request signal again in step S102.

If the identification number is not correct again (S106), the controller 101 disconnects the line and ends communication in step S118.

Thereby, this display apparatus accepts a call only from a specified distant station which knows the secret identification number to avoid mischievous interference by unauthorized distant stations.

If the identification number is correct, the controller 101 waits for a remote command having DTMF (Dual Tone Multi Frequency) signals for two seconds in steps S107 and S108. When the remote command is not received in two seconds, the controller 101 discriminates that the other apparatus is in a image data transmission mode, and sends a transmission request having a "bleep" sound for requesting image transmission (S109). In step S110, this apparatus enters an image reception mode, and receives image data from the calling apparatus by the communication unit 104 while checking for errors in received image data. The received image data is transferred and stored into the memory unit 102 in step S111, and simultaneously is transferred to the screen display unit 103 to display one page of the receiving image data in step S114. Then the controller 101 disconnects the line and ends communication in step S118.

If the memory unit 102 cannot store all the received image data, the controller 101 sends an error signal to the calling station in steps S112 and S113.

When the remote command is received, the controller 101 analyzes the remote command. If the received remote command is discriminated as a display change command in step S115, the controller 101 causes the memory unit 102 to read out image data for the next page, and transfers the read image data to the screen display unit 103 in step S116. The display unit 103 changes the display to the next page in step S117, and the controller 101 disconnects the line and ends communication in step S118.

If the received remote command is discriminated as a polling request command for confirming the display image which is now displayed in step S119, the controller 101 reads out all the image data in the memory unit 102 from the data which is now displayed on the screen display unit 103 in step S120, and causes the communication unit 104 to send the read image data to the calling station via the communication line 105 in step S121. Then the controller 101 disconnects the line 105 and ends communication in step S118 as well.

Thus, the calling station can request this station to send the image data by the DTMF polling request command without using the non-standard procedure of T30 of CCITT recommendation. Generally, the non-standard procedure is different among manufacturers. But, in this case, a calling station which is made by another manufacturer is able to send a polling request if an operator knows the identification number. That is, checking the secret identification number in check secret identification number in step S105 is a substitute for checking a polling ID for the polling operation defined in T30, so that this station can shift to the image transmission mode without carrying out the non standard procedure of T30.

Thereby, an operator of the distant calling station can confirm the image data displayed on the screen display unit 103 by receiving the image data with its own facsimile apparatus.

The controller 101 controls the starting address of the image data which is currently displayed, so that in the polling operation the controller can send the image data currently displayed first. Therefore, an operator at the distant calling station can recognize quickly which image data is currently displayed among plural pages of image data.

If the controller 101 discriminates that the remote command is an automatic image change command in step S122, the controller 101 starts an internal timer in step S123, and stores data showing interval time for display, which is received with a DTMF signal as well as the remote command, into the memory unit 102 in step S124. Then the controller 101 disconnects the line 105 in step S125. The controller 101 compares the interval time with a count value of the internal timer in step S126, and if they coincide, the controller 101 reads out the next image data from the memory unit 102 and causes the display unit 103 to display the next image data in steps S127 and S128. Then the internal timer is reset and restarted in step S129.

Thus, the image data stored in the memory unit 102 is displayed cyclically with a predetermined interval.

When the controller 101 discriminates that the received remote command is another kind of command, the controller 101 carries out a procedure in response to that command in step S130, and disconnects the line 105.

When the called image display apparatus sends an error signal to the calling image display apparatus in a step S113, the operator of the calling apparatus can confirm and delete the image data stored in the memory unit 102 of the called apparatus, utilizing the read-out key 5a and the deletion key 5c explained above. Thus, even when the memory unit 102 becomes full with the image data, it is possible to delete unnecessary image data, such as those of already displayed image, thereby making storage capacity available for the new image data.

In the foregoing embodiments, the images are read in chronological order from the earliest one in response to the read-out instruction signal sent from the calling apparatus to the called side by the actuation of the read-out key 5a, but it is also possible to read and transmit the data file from the memory 3' (or 102). The operator of the calling apparatus can immediately delete a desired image from said memory 3' (or 102), by identifying the number of said image in the data file, entering said number into the key input unit 5 and depressing the deletion key 5c.

The present invention is not limited to the foregoing embodiments but is subject to various modifications within the scope and spirit of the apparatus claims.

I claim:

1. An information communication method for permitting communication between a calling apparatus with a printer or a display and a called apparatus with memory means for storing a plurality of sets of images, each set of images being received by a single receiving operation, the method comprising the steps of:

(a) receiving with said called apparatus a set of images provided thereto from an arbitrary terminal through a communication line;

(b) storing into said memory means the set of images received in step (a);

(c) sending an image transmission request signal from said calling apparatus to said called apparatus;

(d) reading automatically from said memory means of said called apparatus a set of images most previously stored in said memory means without designating said set of images to be read by an operator, and transmitting said set of images to said calling apparatus in response to said request signal;

(e) printing or displaying said set of images transmitted in step (d) using said printer or said display of said calling apparatus; and (f) setting said memory means of said called apparatus at a condition acceptable for storing a new set of images, instead of said set of images transmitted in step (d).

2. A method according to claim 1, further comprising the step of entering a predetermined ID code to said calling apparatus, wherein step (f) is enabled by the input of said predetermined ID code.

3. A method according to claim 1, wherein, if a set of images is not stored in said memory means of the called apparatus in step (d), a signal indicating an absence of the set of image is sent to said calling apparatus.

4. A method according to claim 1, wherein said communication is conducted through a predetermined channel.

5. A method according to claim 4, wherein said channel is a facsimile communication channel.

6. An image display apparatus comprising:

input means for inputting an image transmitted from an arbitrary remote terminal;

memory means for storing plural images input from said input means;

means for displaying an image read from said memory means;

means for communicating said image and signals instructing the processing of said image to another communication apparatus having a printer or a display; and control means for reading automatically from said memory means an image most previously stored in said memory without designating said image to be read by an operator, for transmitting, in response to an image transmission request signal received from said other communication apparatus, said image read from said memory means to said other communication apparatus and for setting said memory means at a condition acceptable for storing a new image, instead of said image read from said memory means.

7. An apparatus according to claim 6, wherein said communication means is adapted to conduct communication through a predetermined channel.

8. An apparatus according to claim 7, wherein said channel is a facsimile communication channel.

9. An apparatus according to claim 6, wherein said display means is adapted to display an image received from said other communication apparatus.

10. A facsimile apparatus comprising:

a communication circuit for transmitting to and receiving from an arbitrary facsimile apparatus an image and a control command;

a memory for storing a plurality of sets of images received by said communication circuit, each set of images being received by a single receiving operation; and a control circuit for operating so that when said communication circuit receives a transmission request command from said other facsimile apparatus requesting a transmission of an image by means of said communication circuit, a set of images most previously stored in said memory is automatically read from said memory without designating the set of images to be read by an operator and transmitted to said other facsimile apparatus for printing or displaying, wherein said memory is set to a condition acceptable for storing a new set of images instead of said firstly stored set of images.

11. A method according to claim 1, wherein said image transmission request signal comprises a DTMF signal.

12. A method according to claim 6, wherein said image transmission request signal comprises a DTMF signal.

13. A method according to claim 10, wherein said transmission request command comprises a DTMF signal.

* * * * *

UNITED STATES PATENT AND TRADEMARK OFFICE
CERTIFICATE OF CORRECTION

PATENT NO. : 5,872,637
DATED : February 16, 1999
INVENTOR(S) : HIROYUKI NAKANISHI It is certified that error appears in the above-identified patent and that said Letters Patent is hereby corrected as shown below:

TITLE PAGE:

AT [56] REFERENCES CITED

OTHER PUBLICATIONS

"M.S." should read --U.S.--.

IN THE DRAWINGS

Sheet 2, FIG. 2, "TRANMIT" should read --TRANSMIT--; and
Sheet 3, FIG. 3, "S15" (second occurrence) should read --S15'--.

COLUMN 1

Line 3, "continuation-in-part division," should read --continuation,--.
Line 35, "are" should read --as--; and
Line 48, "proposed," should read --been proposed,--.

COLUMN 2

Line 7, "to" should be deleted and "new" should read --a new--.

COLUMN 4

Line 1, "discriminate" should read --discriminates--;
Line 21, "a" should read --to--; and
Line 34, "step S23" should read --step S24--.

COLUMN 6

Line 4, "a" should read --an--; and
Line 49, "non standard" should read --non-standard--.

UNITED STATES PATENT AND TRADEMARK OFFICE
CERTIFICATE OF CORRECTION

PATENT NO. : 5,872,637

DATED : February 16, 1999

INVENTOR(S) : HIROYUKI NAKANISHI

It is certified that error appears in the above-identified patent and that said Letters Patent is hereby corrected as shown below:

COLUMN 8

Line 6, "image" should read --images--; and
    Line 24, "memory" should read --memory means--.

Signed and Sealed this

Twenty-first Day of December, 1999

Attest:

Q. TODD DICKINSON

Attesting Officer      Acting Commissioner of Patents and Trademarks